Oct. 26, 1971 H. A. GOODMAN 3,615,062

PUSH-IN TYPE FILM/TAPE CASSETTE

Filed May 1, 1969 2 Sheets-Sheet 1

HOWARD A. GOODMAN, INVENTOR

BY Melvyn D Silver

AGENT

Oct. 26, 1971 H. A. GOODMAN 3,615,062

PUSH-IN TYPE FILM/TAPE CASSETTE

Filed May 1, 1969 2 Sheets-Sheet 2

United States Patent Office 3,615,062
Patented Oct. 26, 1971

3,615,062

PUSH-IN TYPE FILM/TAPE CASSETTE

Howard A. Goodman, Peekskill, N.Y., assignor to International Business Machines Corporation, Armonk, N.Y.

Filed May 1, 1969, Ser. No. 820,981
Int. Cl. B65h 17/48
U.S. Cl. 242—55.21 8 Claims

ABSTRACT OF THE DISCLOSURE

A film or tape cassette for receiving film or tape (film/tape) positively driven into said cassette, comprising a cover member, a take-up reel, and a spiral film guide, whereby film entering said cassette is guided by said spiral film guide about the the outer diameter of the take-up reel, which is frictionally driven by the entering film/tape about a center hub, to wind the film/tape from the outer diameter to the inner diameter of the take-up reel, as opposed to currently winding from the center hub outwardly, for ready replay without rewinding.

FIELD OF THE INVENTION

Means for winding, rewinding, reeling or otherwise accumulating tape, rope, film or other flexibly reelable objects upon or within a take-up reel.

BACKGROUND OF THE INVENTION

It is often desirable that the take-up reel on a film projector or tape recorder be able to accept the incoming tape or film in such a manner that rewinding would not be necessary before replay could be had. Such a take-up reel should, further, be simple in construction, and should not be required to be physically positively driven. Thus, the ideal take-up reel would wind from the outside to the inside, with the only driving force necessary being the force driving the tape past a prior location reading or writing head, or a film past a lens. This driving force is necessary at the read/write or film projection stages, and is not utilized to positively drive the take-up reel itself. Rather, the take-up reel should be driven by no more than that exerted by the driving means upon the film or tape itself.

Prior art devices designed to achieve this purpose have required positively driven take-up reels. Further, the mechanical complexity of these take-up reels has precluded their general use in anything other than the most expensive equipment for commercial purposes. Even in such take-up reels, there are inherent limitations with such units. The most ideal situation would be a receiving cassette which would allow a first in-first out, or first in-last out capability as desired for the film stored on said cassette.

Thus, in summary, a first in-first out; or, first in-last out capability, in a receiving film/tape cassette, not requiring positive driving means, and of inexpensive construction, is desirable.

Thus, an object of this invention is to allow a first in-last out capability in an inexpensive film/tape receiving cassette.

A further object is an improved first in-first out capability in a film/tape receiving cassette.

Still another object is a film/tape receiving cassette allowing rerun of a received film/tape in original sequence without rewinding, and without requiring a positively driven take-up reel.

Yet another object is a film/tape receiving cassette capable of functioning as an inexpensive intermediate storage cassette with first in-first out capability.

These and other objects, features and advantages of the invention will be apparent from the following more particular description of preferred embodiments of the invention, as illustrated in the accompanying drawings.

IN THE DRAWINGS

FIG. 1 is an exploded view of one embodiment of the film/tape cassette of this invention showing a rotatably mounted take-up reel, spiral film guide, and bottom cover member.

FIGS. 2, 3, and 4 are composite drawings of the exploded view of FIG. 1, in perspective, top, and cross-section, including film/tape being wound upon the take-up reel.

SUMMARY OF THE INVENTION

These and othe problems are solved by the film/tape cassette of this invention. Briefly, in one embodiment, this invention comprises a film/tape cassette for receiving film/tape positively driven by outside means, such as a driving means driving film past a lens or tape past a reading head. The driven film/tape enters into the cassette via a spiral film guide, which guides the film/tape along the outer diameter of a freely rotatable take-up reel located inside a bottom cover, the casette comprising the bottom cover, internal take-up reel, and spiral film guide. The film/tape wraps about the outer diameter of the take-up reel and frictionally causes it to rotate, thus relieving further frictional increase. As the take-up reel rotates, the film is progressively wound on the take-up reel from the outer diameter to the inner diameter.

GENERAL DESCRIPTION

Figure 1:
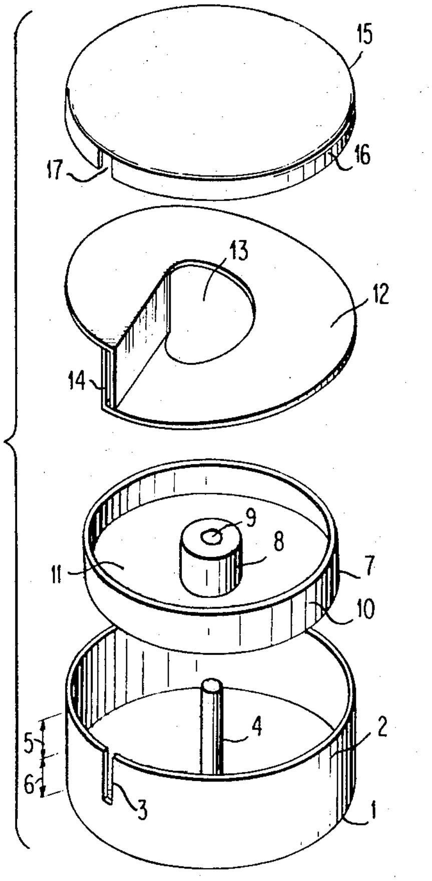

The primary embodiment of this invention is best shown in FIG. 1, which is an exploded view of the basic components of this invention. FIG. 1 shows a bottom cover 1 having an outer wall portion 2, a film input slit 3, and a center shaft 4. For convenience, the height of the outer wall may be considered as being broken into an upper half 5 and a lower half 6.

Ftting into the bottom cover 1, upon and freely rotatable about the shaft 4, is the take-up reel 7. Take-up reel 7 comprises a center hub 8, a center hole 9, an outer guide wall 10, and a bottom side cover 11. While in this embodiment the center hub and the outer guide wall 10 have no motion relative to each other, it should be noted that in a later embodiment, the center hub 8 is freely rotatable relative to the outer guide wall 10.

Fitting over the center hub 8 of take-up reel 7, is spiral film guide 12. Spiral film guide 12 has a cut out section 13 for concentric alignment with center hub 8. Spiral film guide 12 also has a film entrance guide 14, which is aligned with film input slit 3 of bottom cover 1. In such alignment, spiral film guide 12 acts as a top side cover for take-up reel 7.

Optionally available is a top cover 15, comprising an outer wall portion 16 and a film input slit 17.

Thus, when assembled, the take-up reel 7 fits in the lower half 6 of the bottom cover 1. It is free to rotate on the shaft 4 provided in the lower half 6 of the bottom cover 1. The spiral film guide 12 with its film entrance guide 14 is aligned with the film input slit 3 in the upper half 5 of bottom cover 1. The top cover 15, with its film entrance slot 17, completes the entire assembly.

Figure 2:
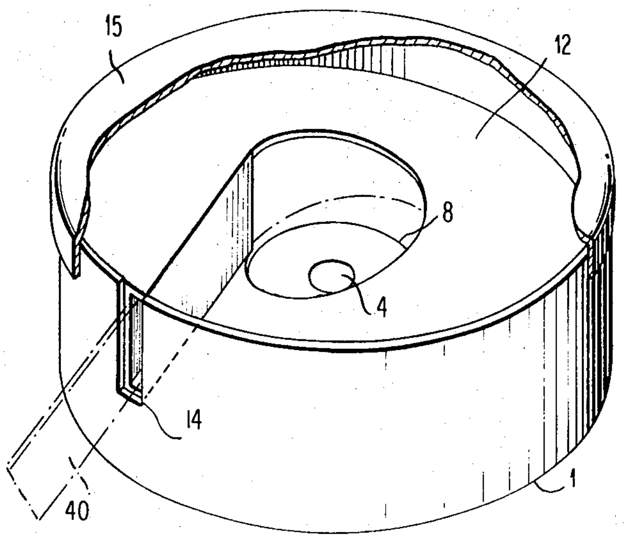
Figure 3:
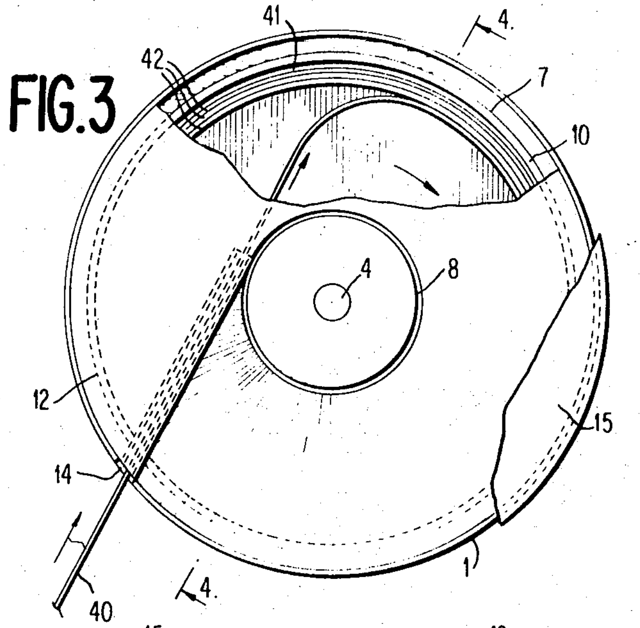
Figure 4:
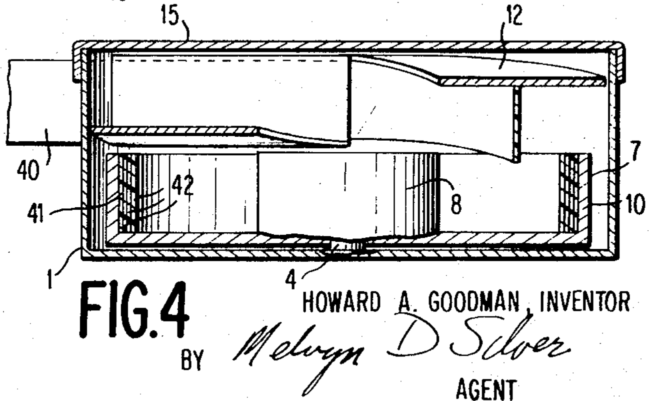

In operation, the unit functions in the following manner. Film or tape 40, referred to as film/tape, is inserted into the opening of the film entrance guide 14 and pushed into the cassette, as shown in FIGS. 2, 3, and 4. The mode of power is supplied by whatever driving means are utilized to drive the tape past a reading or writing head, or film past a lens system. No driving means is otherwise applied to the receiving cassette. As the film is literally pushed into the cassette, this type of cassette may also be referred to as a push-in film/tape cassette.

The leading edge of the film travels through the film entrance guide 14 and tangentially toward the center hub 8 of the take-up reel 7. As the leading edge leaves the film entrance guide 14, the film is guided downward to the lower half of the bottom cover 1 by the spiral film guide 12. As film/tape is deposited onto the take-up reel 7, the diameter of the first wrap 41 increases until it is the same as that of the outside diameter of the take-up reel 7, as defined by the outer guide wall 10. The outer guide wall 10 is ideally just the right height to accept the proper width of film or tape desired to be wrapped.

Further expansion of the film diameter is prevented by the outer guide wall 10 of the take-up reel 7. Friction between the take-up reel and the film/tape starts the take-up reel rotating about the shaft 4. Thus, the first film wrapped is wound around the outermost diameter of the take-up reel and subsequent wraps 42 are wound inside one another.

Although the inertia of the take-up reel increases as more and more film is wound onto it, there is no increase in the frictional force between the film and the cassette as is the case in other types of push-in cassettes. Therefore, once the inertial starting resistance of the take-up reel, plus any film on the take-up reel, is overcome, the force required to push additional film into the cassette remains the same no matter how much film is already inside the cassette. This is the reason for the requirement that the take-up reel 7 be freely rotatable via the center hub about the shaft 4 of bottom cover 1.

Before going into other embodiments, the device is best summarized at this point. Thus, this device is a push-in type film/tape cassette for collecting (or dispensing) film or tape in instances where the take-up (or supply) shaft is not positively driven. The device employs a spiral film guide to direct the film down into a take-up reel, which is freely rotatable about a center supporting shaft.

This cassette is self-contained and completely enclosed, and can be mounted and operated in any position. The device is relatively simple, having no moving parts per se. The absence of a driving apparatus allows the cassette to easily be removed from the rewind station as a complete and self-contained unit.

Further, the device, being driven simply by pushing film into the guide from some external point, will cause the film tension to be self-regulating.

Thus, it is evident that the cassette of FIG. 1 is readily adapted for a first in-last out system by removing film via the spiral film guide; or first in-first out by removing the take-up reel from the cassette, and removing the outer guide wall 10, as discussed later. With slight modification, however, other capabilities become evident.

Figure 5:
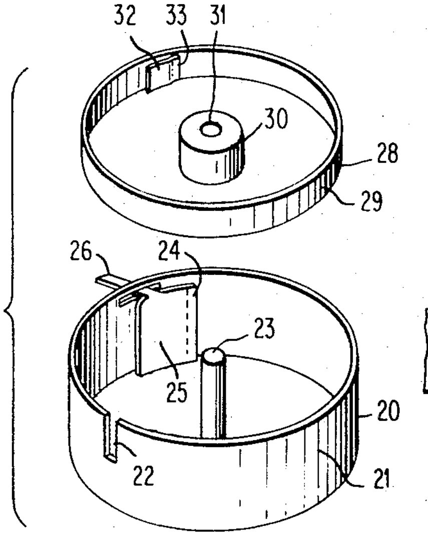
FIG. 5 is an exploded view of another embodiment of the film/tape cassette of this invention showing the bottom cover and take-up reel with film engaging means for allowing first in-first out capability.

Thus, if the bottom cover 1 and take-up reel 7 of FIG. 1 are slightly modified, as shown in FIG. 5, other results are possible. FIG. 5 shows a bottom cover 20 having an outer wall portion 21, a film input slit 22, a center shaft 23, an exit slit 24, and an engaging means 25. Take-up reel 28 comprises an outer wall portion 29, a center hub portion 30, a center hole 31, catch member means 32, and an exit slit 33. Take-up reel 28 and bottom cover 20 would be assembled with spiral film guide 12 and top cover 15 as shown in FIG. 1. In operation, film/tape entering take-up reel 28 is guided about the outer periphery of the take-up reel, that is, along outer guide wall 29. The leading edge of the film comes into contact with a catch member means, such as the spring load protruding slit member 32 as shown in FIG. 5. The leading edge engages on the slit member, and exits through exit slit 33 to the outerside of the take-up reel. It is thus in a position between the take-up reel and the inner wall of the bottom cover 20.

Thus the tape entering take-up reel 28 and being caught by catch member means 32 and exiting via exit slit 33 would appear to continually exit via exit slit 33 and jam the system. However, catch member means 32 is deliberately designed to allow but a small amount of film/tape to exit via exit slit 33 before frictional forces of the incoming film/tape begin rotating take-up reel 28 about shaft 23. As the film/tape begins to wrap about itself from the outside diameter to the inside diameter of tape-up reel 28, no additional film will exit via exit slit 33. However, when it is desired to remove film from the take-up reel in a first in-first out manner, engaging means 25 of bottom cover 20 is utilized. By pushing on handle 26, engaging means 25 is pushed out to engage that film having already exited from exit slit 33, and to guide such film to exit slit 24 of bottom cover 20. At that point, the film/tape may be positively engaged and continually unwound from the take-up reel. As the film is unwound from the take-up reel, it is evident that outer guide wall 29 must remain in a fixed position. Thus, as film/tape is initially withdrawn, the film/tape will tend to collapse upon itself, shrinking in diameter until it engages the hub 30. In this embodiment, hub 30 is freely rotatable relative to outer guide wall 29. Thus, when the film/tape "shrinks" about the hub 30, no further frictional forces will be encountered, and the tape will freely unwind.

The above embodiment, as shown in FIG. 5, is useful as an intermediate storage means for tape, as well as a basis first in-first out system.

Figure 7:
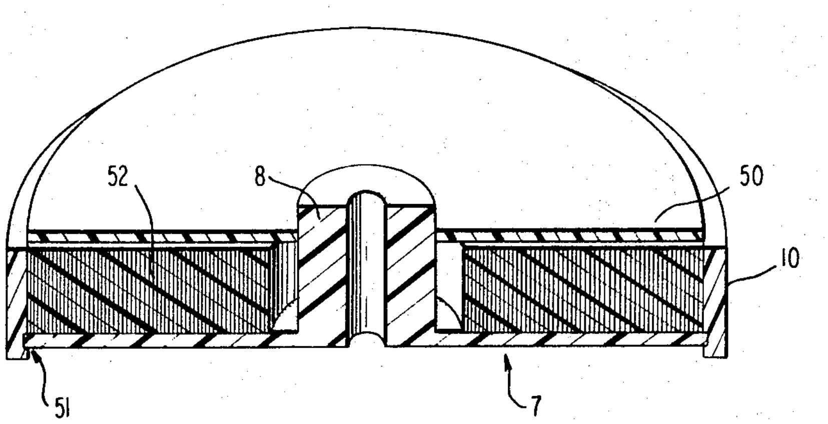
FIG. 7 is a cross-sectional view of a take-up reel usable in this invention, having removable side wall covers and outer guides.

Thus, FIG. 1 shows a first in-last out system; and FIG. 5 shows a first in-first out system. Another first in-first out system is readily available by referring to FIG. 1 with the following modification of the take-up reel, shown in FIG. 7.

After film is wound on take-up reel 7 from the outer wall 10 towards center hub 8, take-up reel 7 can be removed from the system. If at this point a flat cover member 50 of circular section is attached to center hub 8, as by a frictional fit, and outer guide wall 10 is removed via detachable attachment, such as being snap fitted to bottom cover 11, as shown at 51, to take-up reel 7, what remains is a take-up reel comprising a first circular side cover 11, a center hub 8 located centrally upon said first side cover 11, an outer guide located concentrically with said center hub 8 upon said first side cover 11, said outer guide wall 10 being detachable from the first side cover 11, and in this example, being detached therefrom, and a second adjustably removably attached side cover 50 attached to said center hub 8 at a distance from said first side cover 11 adjusted to be essentially equal to the width of the film/tape 52 to be wound upon the take-up reel. Thus, the take-up reel is ready for attachment to, for example, a projector, whereby the leading edge may be rerun through the projector, without rewinding being necessary.

Figure 6:
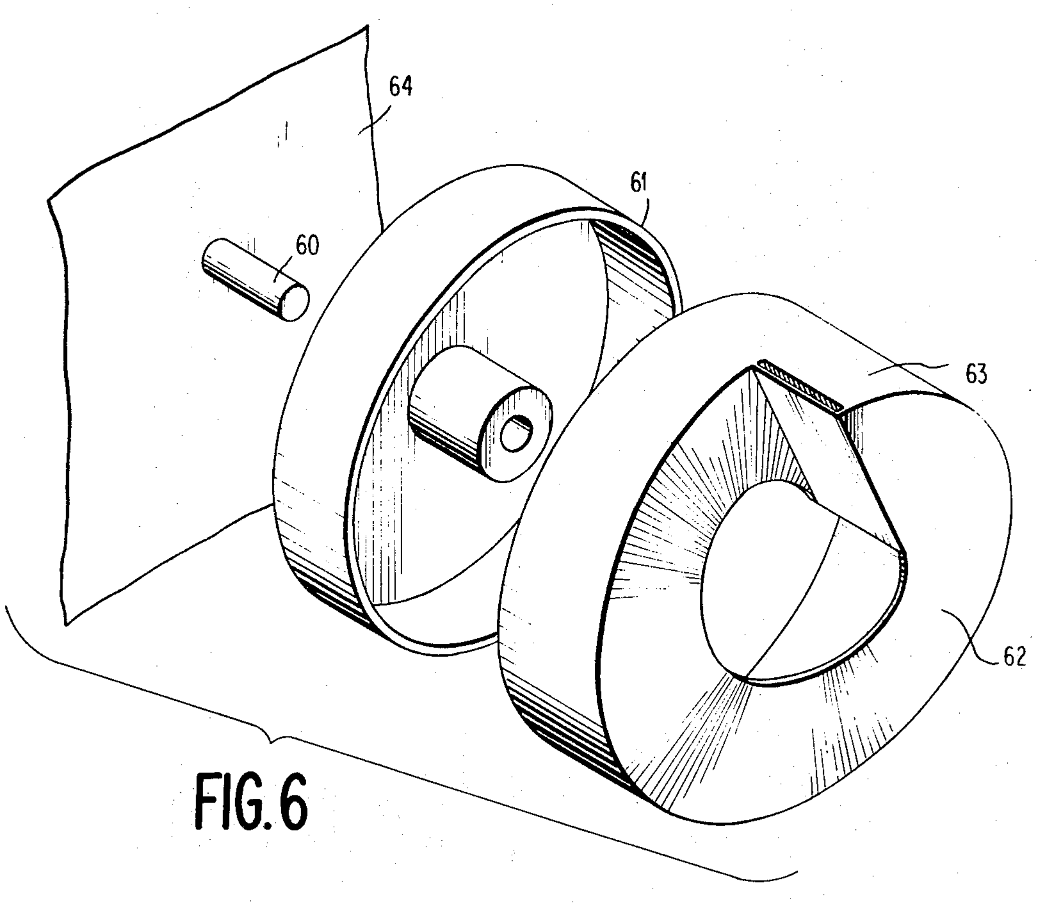
FIG. 6 is an exploded view of an alternate embodiment of this invention, showing the spiral film guide with extended rims, and the take-up reel mounted upon a shaft means.

It must be noted that many variations of this invention are possible, the key elements being the spiral film guide and the rotatable take-up reel. Thus, in the broadest form, all that is necessary is a spiral film guide, and means for keeping it in a fixed position; and a take-up reel, with means allowing the take-up reel to rotate in response to frictional pressure of film/tape against the outer guide wall, the film/tape being guided into the take-up reel by the spiral film guide. Thus, the take-up reel could be set on bearings, or upon a shaft 60 as shown in FIG. 6. In FIG. 6, shaft 60 is mounted on, for example, a computer tape drive unit, and take-up reel 61 is placed upon it. Spiral film guide 62 has extended side walls 63 so as to be properly aligned with take-up reel 61, while being flush with surface 64. In this example, the bottom cover 1 of FIG. 1 is completely replaced.

Cassettes, as discussed so far, have additional utility in computer tape drive units. By placing film/tape drive means near the film entrance guide of a spiral film guide, two cassettes now replace the presently used two take-up reels, but with the advantage that since no rewinding is needed, using the embodiment of FIGS. 5 or 7, time is saved in removing and replacing tape reels in a system where the human element is the slowest factor.

While various embodiments have been shown, it is evident that a first in-first out, or first in-last out capability exists for this cassette in its varying embodiments. Certain modifications can easily be made to the basic invention shown here. For example, in the embodiment of FIG. 5, the engaging means may be a spiral film guide having exit guide means aligned with the exit slit of the bottom cover 20. Other variations are, of course, possible.

Thus, the objects of this invention have been fully met. The device is simple, easy to construct, and inexpensive. It can, for example, be made of clear plastic, easily moldable.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A push-in type film/tape cassette for winding incoming film/tape about a take-up reel from its outer diameter to its inner diameter comprising:

- a bottom cover having an outer wall portion, a centrally located shaft, and a film input slit;
- a take-up reel having a center hub portion and an outer guide wall concentric to said center hub portion, being rotatably mounted on said centrally located shaft so as to be freely rotatable thereon;
- a spiral film guide having a film entrance guide, said film entrance guide being fixedly aligned with said film input slit of said bottom cover, said spiral film guide constituting a side wall cover for said take-up reel and allowing film-tape pushed into said film input slit to be guided about said spiral film guide to contact said outer guide wall of said take-up reel which rotates under the frictional force of the film/tape about said centrally located shaft;

whereby incoming film/tape is wound upon said take-up reel from its outer diameter to its inner diameter.

2. The cassette of claim 1 wherein said center hub portion of said take-up reel is freely rotatable with respect to said outer guide wall.

3. The cassette of claim 1 including a top cover having a film input slit, said top cover mating with said bottom cover to enclose said spiral film guide and said take-up reel, said top cover film input slit being fixedly aligned with said bottom cover film input slit and said spiral guide film entrance guide.

4. The cassette of claim 1 wherein said outer guide wall of said take-up reel includes catch member means and an exit slit, for interference engagement with the leading edge of the incoming film/tape.

5. The cassette of claim 4 and means for limiting the amount of film/tape that may exit through said exit slit.

6. The cassette of claim 4 wherein said bottom cover includes an exit slit and engaging means fo rengaging therethrough the leading edge of the film/tape engaged by said catch member means of said take-up reel.

7. The cassette of claim 6 wherein said engaging means is a spiral film guide having a film exit guide aligned with said exit slit of said bottom cover.

8. The cassette of claim 1 wherein said outer guide of said take-up reel includes means for detaching said outer guide from said take-up reel.

References Cited

UNITED STATES PATENTS

| | | | |
|---|---|---|---|
| 1,950,601 | 3/1934 | Droll et al. | 242—55.21 |
| 2,182,723 | 12/1939 | Feller | 242—55.21 |
| 2,278,367 | 3/1942 | Freimann et al. | 242—55.21 |
| 2,812,177 | 11/1957 | Kleerup | 242—55.21 |
| 3,292,875 | 12/1966 | Rojic | 242—55.21 |

BILLY S. TAYLOR, Primary Examiner